Figure 1:
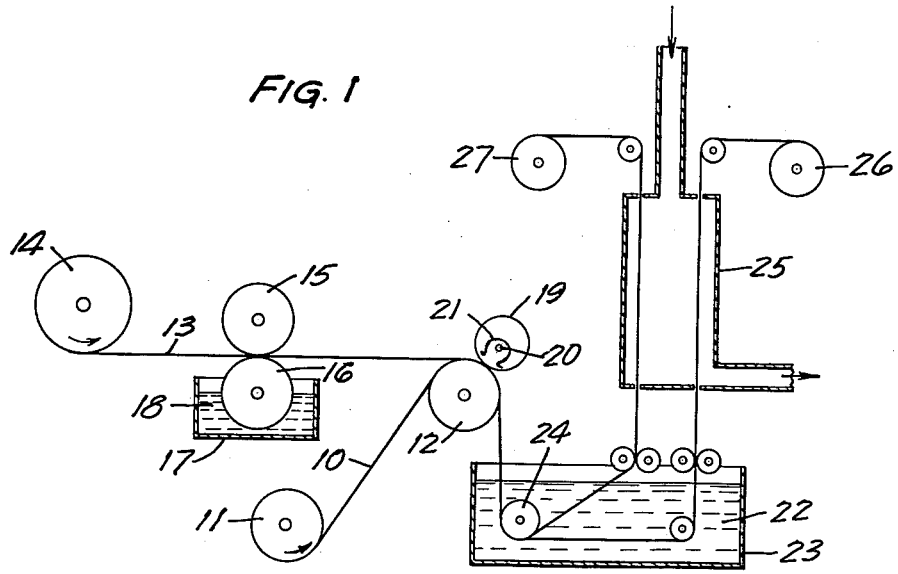

Nov. 19, 1963        R. H. APPELDORN         3,111,584
    COPY-SHEET AND METHOD FOR PRODUCING COPIES OF GRAPHIC
              ORIGINALS IN THE FORM OF POSITIVE
                   PROJECTION TRANSPARENCIES
                     Filed May 25, 1960

INVENTOR
ROGER H. APPELDORN
BY
Carpenter, Abbott, Coulter & Kinney
ATTORNEYS 3,111,584
COPY-SHEET AND METHOD FOR PRODUCING COPIES OF GRAPHIC ORIGINALS IN THE FORM OF POSITIVE PROJECTION TRANSPARENCIES
Roger H. Appeldorn, Mahtomedi, Minn., assignor to Minnesota Mining and Manufacturing Company, St. Paul, Minn., a corporation of Delaware
Filed May 25, 1960, Ser. No. 31,581
13 Claims. (Cl. 250—65)

This invention relates to the formation of light-images, and is particularly concerned with novel sheet materials and their preparation, and with methods for producing with such materials copies of graphic originals in the form of positive projection transparencies using thermographic copying procedures.

It is frequently desirable to project light-images of printed matter, sketches or drawings, typewritten or handwritten information or the like on viewing screens in classrooms or other assemblies. Lecturers or instructors commonly employ so-called "overhead projectors" in presenting visual information to their audiences. When the information is taken from printed books, original drawings or writings, it is found convenient to reproduce the original in the form of full size copies on transparent films. Conventional silver halide photographic films or plates are useful for such purposes but the raw film must be stored and processed in the absence of light; chemical developing, reversing, and fixing solutions are required; and the process is time-consuming and expensive.

The present invention makes possible the preparation from graphic originals of full size reproductions in the form of positive projection transparencies. When projected on a viewing screen, the light-image appears as a black-on-white duplicate of the black-on-white original. The transparency is produced directly from the original by a thermographic reproduction process which need involve no subsequent developing or fixing operations. Additional information may be entered on the sheet and viewed on the screen, and a pencil or other pointer employed by the lecturer at the projection surface in emphasizing some particular bit of information also produces an effective image on the screen. The copies are easily and quickly prepared either as separate sheets or in continuous strip form as desired.

These and other advantages are obtained, in accordance with the invention, by providing a novel heat-sensitive copy-sheet capable, when locally heated, of converting from a partially or fully transparent state to a less transparent or more highly light-diffusing state through surface rearrangement, and by applying to said copy-sheet a heat-image corresponding to the desired copy, preferably by thermographic processes involving the brief intense irradiation of a differentially radiation-absorptive graphic original in heat-conductive contact with said copy-sheet.

Figure 2:
Figure 3:
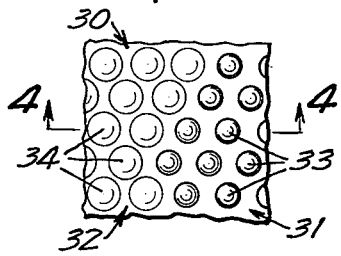
Figure 4:
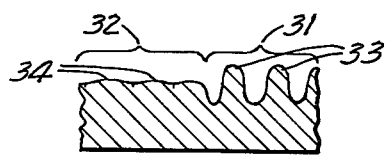

In the drawing, which illustrates certain aspects of the invention,

FIGURE 1 is a schematic representation of the continuous reproduction of a graphic original as a positive projection transparency on one form of copy-sheet material, FIGURE 2 is a schematic representation of the copying step on an enlarged scale, and FIGURES 3 and 4 are stylized representations, in plan and in section respectively, of a portion of one form of a positive projection transparency prepared in accordance with the principles of this invention.

In FIGURE 1 a graphic original, in this case a photographic positive 10 having preferentially radiation-absorbent silver image areas in a transparent gelatin binder on a transparent support film, is drawn in continuous strip form from supply reel 11 around a compressible pressure drum 12. A transparent plastic film 13 is meanwhile drawn from supply roll 14 between squeeze rolls 15 and 16, the latter dipping into a tank 17 of penetrating liquid 18. The two webs are brought into face-to-face pressure contact between pressure drum 12 and transparent cylinder 19, and at the same time are briefly irradiated with intense radiation from an incandescent filament source 20 within a reflector 21. The two webs then travel into wash liquid 22 in tank 23, and around drum 24, where they are again separated, being thereafter drawn between separate sets of squeeze rolls and through a drying oven 25 supplied with a counter-flow current of warm air. The dried photographic film is wound up on reel 26 and the plastic film, now impressed with strongly light-diffusing image areas, is wound up on roll 27.

The action is further indicated in FIGURE 2. Radiation from the source 28 passes through the copy-sheet and is absorbed in the image areas 29. The resultant heat pattern causes a physical re-arrangement at the surface of the plastic film 13 in contact with the liquid penetrant 18, here indicated by a row of X's at the interface.

FIGURES 3 and 4 represent a typical area of another form of the copy-sheet 30 which has been subjected to localized heating. The heated area 31 is represented as made up of a large number of microscopic half-beads or lens-like projections 33, whereas the unheated background area 32 is lightly marked or crazed with a myriad of microscopic cracks providing an "orange-peel" appearance and having microscopically minutely arcuate areas 34. To the unaided eye and under normal room illumination the background areas appear cloudy or hazy, and the image areas appear white and opaque. Both areas will transmit light, but the light passing through the image areas is severely diffused whereas most of the light passing through the background areas proceeds in a straight line. When focused on a viewing screen in an overhead projector, the transmitted light therefore produces dimly lighted dark-appearing image areas against a brightly lighted background. Under the microscope and with vertical illumination, the area 31 is seen as a series of separate small black dots of somewhat irregular outline, whereas the area 32 appears as much lighter and somewhat larger separated spots within a similarly irregular closed path of separation.

The proportion of the light passing through the copy-sheet in a straight line, i.e. the transparency value, is conveniently determined by means of photocell equipment at the viewing screen as light is projected thereto through the pertinent areas of the copy-sheet. The equipment is first adjusted to provide a reading of 100% with the light from the projector falling directly on the screen, and 0% with the projector completely masked. Under such conditions the clear transparent plastic film shows a transparency value of about 85–95%. Cloudy areas such as the background areas 32 of the sheet 30 of FIGURE 3 may have a transparency value as low as about 50% or even considerably lower, with the value for the image area 31 then being sufficiently below that value to provide an easily visible image on the screen. With clear background areas, much less diffusion in the image areas is required in order to obtain the required degree of visual contrast at the viewing screen.

It has now been found that transparent smooth-surfaced plastic film which when moderately heated will shrink to less than about ¾ of its initial area may, by application of suitable penetrants, be made suitable for use as heat-sensitive copy-sheets in the preparation of positive projection transparencies from graphic originals by thermographic copying procedures.

The following specific examples will serve to illustrate but not to limit the invention.

*Example 1*

A 4 x 4 inch section of a thin transparent smooth-surfaced vinyl chloride-vinyl acetate copolymer film (Geon 8858 vinyl film) is freely suspended in an oven and heated for five minutes at 120° C. The film contracts to approximately 1½ x 1½ inch.

A sheet of the original film is coated on one surface with a layer of diisooctyl phthalate, applied as uniformly as possible by hand swabbing with a cotton swab saturated with the liquid plasticizer. The average coating weight is .032 gram per square foot.

The coated sheet is placed with the coated surface in contact with the printed surface of a typewritten document and the composite subjected to brief intense irradiation in a thermographic copy-machine of the type described in Kuhrmeyer et al. U.S. Patent No. 2,891,165. The coated sheet is next rinsed with ethyl alcohol to remove the diisooctyl phthalate; heptane is equally useful. The film is found to have a reproduction of the typewritten original in white rough-surfaced light-diffusing letters on a clear background. Used on an overhead projector, the copy provides a clear positive image on the viewing screen. Markings in grease pencil are readily applied to the sheet.

*Example 2*

The vinyl film of Example 1 in continuous length is passed through the apparatus of FIGURE 1. As a graphic original there is used a continuous strip of 35 mm. positive "movie" film. The vinyl film is coated with diisooctyl phthalate from tank 17 and the films are rinsed in ethyl alcohol before drying. A positive projection transparency copy of the original is obtained. Any initial excess of diisooctyl phthalate is removed by the squeezing action of the drum 12 and the cylinder 19.

*Example 3*

A clear transparent smooth film of a copolymer of styrene and acrylonitrile ("Polyflex 200" copolymer film), soluble in acetone, partly soluble in toluene, and insoluble in heptane, is found to contract from an initial 4 x 4 inch to a final 1¾ x 1¾ inch size on heating at 140° C. for 5 minutes. The extended film is coated in continuous strip form over one surface with a solution of 10 parts by weight of chlorinated polyphenyl ("Aroclor 5442," softening at 50–61° C.) in 90 parts of toluene. The coating is applied with a ruling mill having 250 lines per inch cut to a depth of 1 mil. A smooth coat is obtained which is dried at moderately elevated temperature to avoid shrinkage or blushing. The coated film is flexible, transparent and non-tacky. A section of the film is placed with its coated surface in contact with a printed original and exposed to brief intense irradiation as in Example 1, producing an effective positive projection transparency with clear transparent background areas. The coated film does not soften or otherwise deteriorate on prolonged storage, whereas the coated film of Examples 1 and 2 slowly softens when the plasticizer is not removed by rinsing.

An equally effective coated film is obtained by lightly coating the "Polyflex 200" copolymer film with a mixture of 40 parts by weight of diethylene glycol monoethyl ether, 6 parts of "Aroclor 5460" (a chlorinated polyphenyl softening at 100–105° C.), and 50 parts of heptane, and drying as before.

*Example 4*

"Polyflex 200" oriented heat-shrinkable copolymer film as used in Example 3 is lightly coated with toluene and is permitted to dry at room temperature, with final brief heating at 60° C. in a drying oven. The film is found on inspection to have a uniformly cloudy surface. It is then placed against a typewritten original and subjected to the thermographic copying process. The resulting positive projection transparency provides ample image contrast for easy and effective viewing on the overhead projector. On the contrary, the untreated film produces a barely visible image.

Somewhat less but still useful degree of contrast is obtained when acetone is substituted for toluene in the foregoing treatment.

Effective copy-sheets are obtained by similar treatment of oriented heat-contractile polystyrene films with ethyl acetate, carbon tetrachloride, methylethyl ketone, and diethylene glycol monoethylether. Heat-contractile methyl methacrylate film is also effectively treated with toluene and with diethylene glycol monoethylether. In all cases the film is rendered visibly cloudy by the solvent. On the other hand, solvents such as naphtha, heptane, and ethyl alcohol are ineffective on all of these films, which remain fully clear and transparent when treated therewith.

Octylene glycol and "Carbowax" polyethylene glycol are effective in conjunction with heat-contractile films of polystyrene and of styrene-acrylonitrile copolymer, and have the advantage of being removable by washing with water; the higher molecular weight materials may alternatively be permitted to remain on the film.

*Example 5*

Oriented polyethylene terephthalate ("Mylar" polyester) film, which has not been heat-set and which contracts to a minor fraction of its initial area when heated, is lightly coated with catechol applied from heptane, to produce an effective heat-sensitive copy-sheet with which to prepare positive projection transparencies from graphic originals by thermographic copying procedures. Benzyl chloride, benzyl alcohol, methyl isopropyl catechol, vanillin and other incipient plasticizer penetrants are also effective with the polyester film. The more volatile materials are applied to the film just prior to the copying procedure. The material may subsequently be removed either by rinsing with an appropriate solvent or by volatilization, or may be allowed to remain on the film surface.

It has been found possible to obtain copies useful for the purposes of this invention with plastic films which are heat-contractile only to about three-fourths of their initial area. For example, a vinyl film which on heating contracts from an initial size of 12 x 12 inches to a final size of 10 x 10 inches provides good contrast, but a film which changes from an initial 10 x 12 inches to a final 10¼ x 10 inches is inadequate where high contrast visual image qualities are required.

Microscopic examination has shown that, as indicated in FIGURES 2 and 3, the light-diffusing properties of the image areas are due to the violent disruption of the film surface. The presence of a liquid penetrant during localized heating of the film presumably provides lines of weakness or of reduced cohesive strength between polymer molecules or groups of molecules which are then drawn by elastic memory into a more compact shape. Similarly, it seems likely that the volatile solvents penetrate along macromolecular juncture planes in the polymer surface and form lines or narrow paths of weakness or low cohesion within the surface which, when heat is applied, again permit shrinkage. In any event, and regardless of theory, the heated areas of the projection transparency are found to be covered with microscopic somewhat irregularly shaped hemispherical bumps or projections which effectively diffuse the light. The unheated background areas of films coated with normally solid penetrants as in Example 3, or of films in contact for only a short time with liquid plasticizer penetrants as in Example 1, remain perfectly clear. The films treated with volatile liquid solvent penetrants have a crazed or cloudy, microscopically minutely multi-arcuate or "orange-peel" surface.

Since the disruption occurs essentially at the penetrant-treated surface of the film, the thickness of the film is not critical but may vary within rather wide limits. Excessively thick films are not as easily processed in thermographic copying, and are difficult to orient or stretch to the extent desired, and hence films much thicker than about five mils are seldom employed in the practice of the invention. Very thin films have a tendency to perforate at the heated areas, so that films less than about one-half mil in thickness are not ordinarily useful for the purposes of this invention unless supported on a suitable carrier. Film thicknesses of about 2-3 mils combine easy handling with optimum projection characteristics and minimum cost, and are generally preferred.

Although single thicknesses of film are ordinarily employed on overhead projectors for classroom or lecture work, it is sometimes convenient to combine two or more such transparencies, i.e. for projecting a composite image or for other purposes. In such cases somewhat greater transparency of background areas is required than in the case of single films, which, as has previously been shown, are found to be useful at surprisingly low transparency values.

A number of methods for treating heat-shrinkable clear polymeric films have been individually described and by which there are produced film products with which positive projection transparencies may be prepared by simple thermographic copying procedures from typewritten or other graphic originals. Various combinations of these methods may also be employed. For example, a film which has been preliminarily treated with a volatile solvent type of penetrant, as in Example 4, may be further coated with a liquid plasticizer type of temporary penetrant or with a fusible solid plasticizer type of a permanent or incipient penetrant, whereby to reduce the temperature requirements or otherwise to facilitate copying of the original, or to increase the background transparency, or for other purposes. The film may be provided on the untreated surface with an adherently attached transparent supporting film. These and other variations and modifications are contemplated as coming within the ambit of the invention as defined in the following claims.

What I claim is as follows:

1. Method of making a positive projection transparency comprising establishing a microscopic pattern of differential cohesion at the surface of a clear thin heat-contractile plastic film by applying a penetrant to said surface, and locally heating said film at image areas to an extent sufficient to permit localized microscopic contraction and roughening of said film at said surface.

2. Method of making a positive projection transparency comprising coating the surface of a thin heat-contractile plastic film with a liquid plasticizer penetrant, locally heating the coated film to an extent sufficient to permit roughening of said film at said surface, and removing said penetrant.

3. Method of making a positive projection transparency comprising coating the surface of a thin heat-contractile plastic film with a normally solid fusible plasticizer penetrant, and locally heating the coated film to an extent sufficient to permit roughening of said film at said surface.

4. Method of making a positive projection transparency comprising coating the surface of a clear thin heat-contractile plastic film with a volatile liquid solvent penetrant, evaporating said penetrant to provide a crazed cloudy surface and a reduced transparency value, and locally heating the film to an extent sufficient to cause surface roughening and further reduction in transparency value of said film.

5. Method of copying a differentially radiation-absorptive graphic original as a positive projection transparency comprising briefly intensely irradiating said graphic original while in heat-conductive contact with the surface of a thin heat-contractile plastic film having at said surface a microscopic pattern of differential cohesion.

6. Method of copying a differentially radiation absorptive graphic original as a positive projection transparency comprising coating the surface of a clear thin heat-contractile plastic film with a liquid plasticizer penetrant, placing the coated film in heat-conductive contact with a differentially radiation-absorptive graphic original, briefly intensely irradiating said original to provide a heat-pattern sufficient to cause localized surface contraction at the coated surface of said film, and removing said penetrant from said surface.

7. Method of copying a differentially radiation-absorptive graphic original as a positive projection transparency comprising placing in heat-conductive contact with said original a thin heat-contractile plastic film coated on the adjacent surface with a normally solid fusible plasticizer penetrant, briefly intensely irradiating said original to provide a heat-pattern sufficient to cause localized surface contraction at the coated surface of said film, and removing said penetrant from said surface.

8. Method of copying a differentially radiation-absorptive graphic original as a positive projection transparency comprising placing in heat-conductive contact with said original a thin heat-contractile plastic film having a microscopic minutely multi-arcuate crazed surface, and briefly intensely irradiating said original to an extent sufficient significantly to decrease the radius of curvature of the arcuate areas.

9. Method of making a heat-sensitive copy-sheet suitable for the preparation from differentially radiation-absorptive graphic originals by thermographic copying procedures of positive projection transparencies, said method comprising uniformly applying to a surface of a clear thin heat-contractile plastic film a thin coating of a liquid penetrant, and maintaining said coating on said film surface for a time sufficient to establish at said surface a microscopic differential cohesion pattern.

10. Method of making a heat-sensitive copy-sheet suitable for the preparation from differentially radiation-absorptive graphic originals by thermographic copying procedures of positive projection transparencies, said method comprising uniformly applying to a surface of a clear thin heat-contractile plastic film a thin coating of a volatile liquid solvent penetrant, maintaining said coating on said film surface for a time sufficient to establish at said surface a microscopic differential cohesion pattern, and then removing said penetrant by evaporation.

11. A heat-sensitive copy-sheet suitable for the preparation of positive projection transparencies by thermographic copying procedures from differentially radiation-absorptive graphic originals, said copy-sheet being a thin film of transparent plastic material, heat-contractile at least to about three-fourths of its initial dimensions, and having a microscopic minutely multi-arcuate surface having the appearance characteristic of "orange peel."

12. A heat-sensitive copy-sheet suitable for the preparation of positive projection transparencies by thermographic copying procedures from differentially radiation-absorptive graphic originals, said copy-sheet comprising a thin film of transparent plastic material, heat-contractile at least to about three-fourths of its initial dimensions, and having on one surface a thin transparent coating of normally solid fusible plasticizer penetrant.

13. A heat-sensitive copy-sheet suitable for the preparation of positive projection transparencies by thermographic copying procedures from differentially radiation-absorptive graphic originals, said copy-sheet comprising a film of a transparent copolymer of polystyrene and acrylonitrile about 2–3 mils in thickness, said film being heat contractile to less than one-half its initial area, and a thin uniform coating on one surface of said film of a normally solid transparent chlorinated diphenyl.

References Cited in the file of this patent

UNITED STATES PATENTS

| | | | |
|---|---|---|---|
| 2,256,093 | Land | Sept. 16, | 1941 |
| 2,497,376 | Swallow et al. | Feb. 14, | 1950 |
| 2,699,113 | Hoover | Jan. 11, | 1955 |
| 2,721,513 | Marron | Oct. 25, | 1955 |
| 2,740,895 | Miller | Apr. 3, | 1956 |
| 2,868,124 | Crawford | Jan. 13, | 1959 |
| 2,954,311 | Vander Wheel | Sept. 27, | 1960 |
| 2,993,805 | Kay | July 25, | 1961 |